April 30, 1963    F. P. SHARPE    3,087,629
TRANSPORTING APPARATUS
Filed Dec. 16, 1960    7 Sheets-Sheet 7
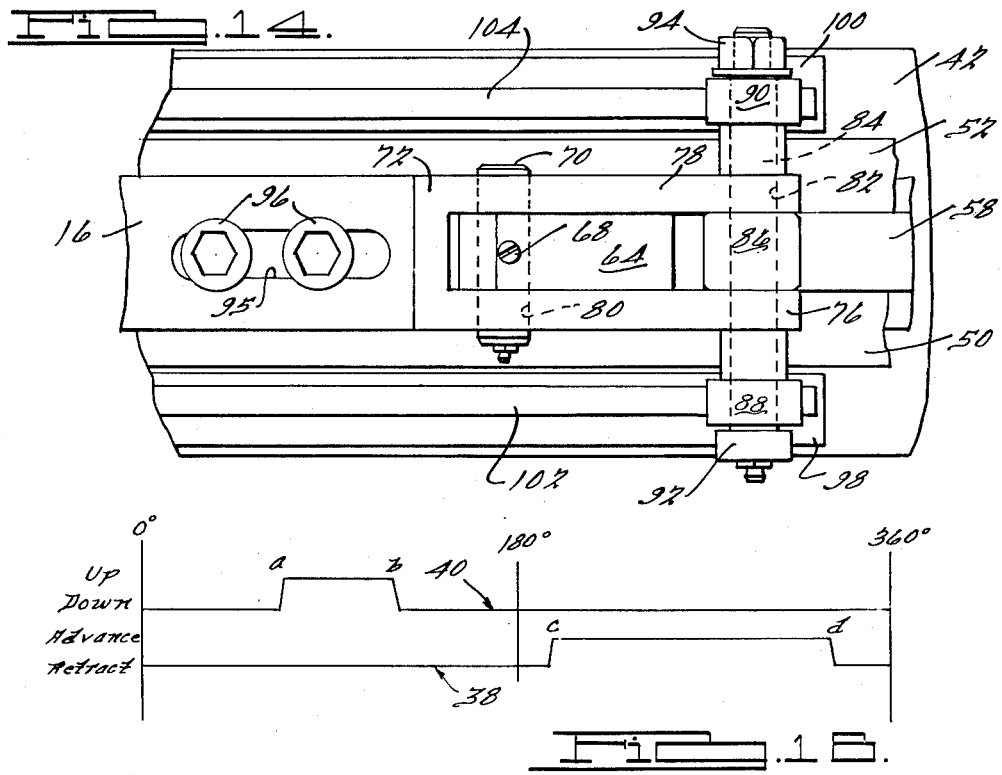
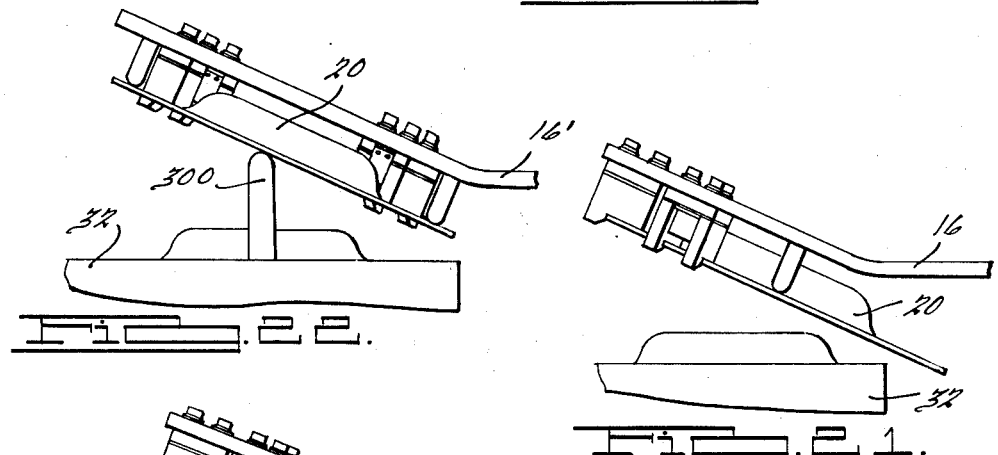
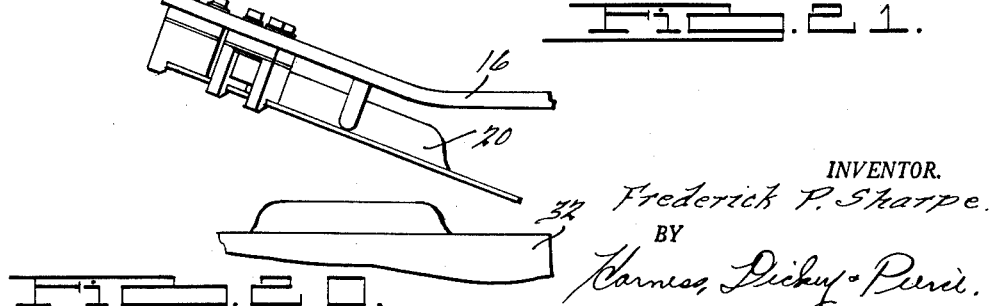
INVENTOR.
Frederick P. Sharpe.
BY
Harness, Dickey & Pierce.
ATTORNEYS.

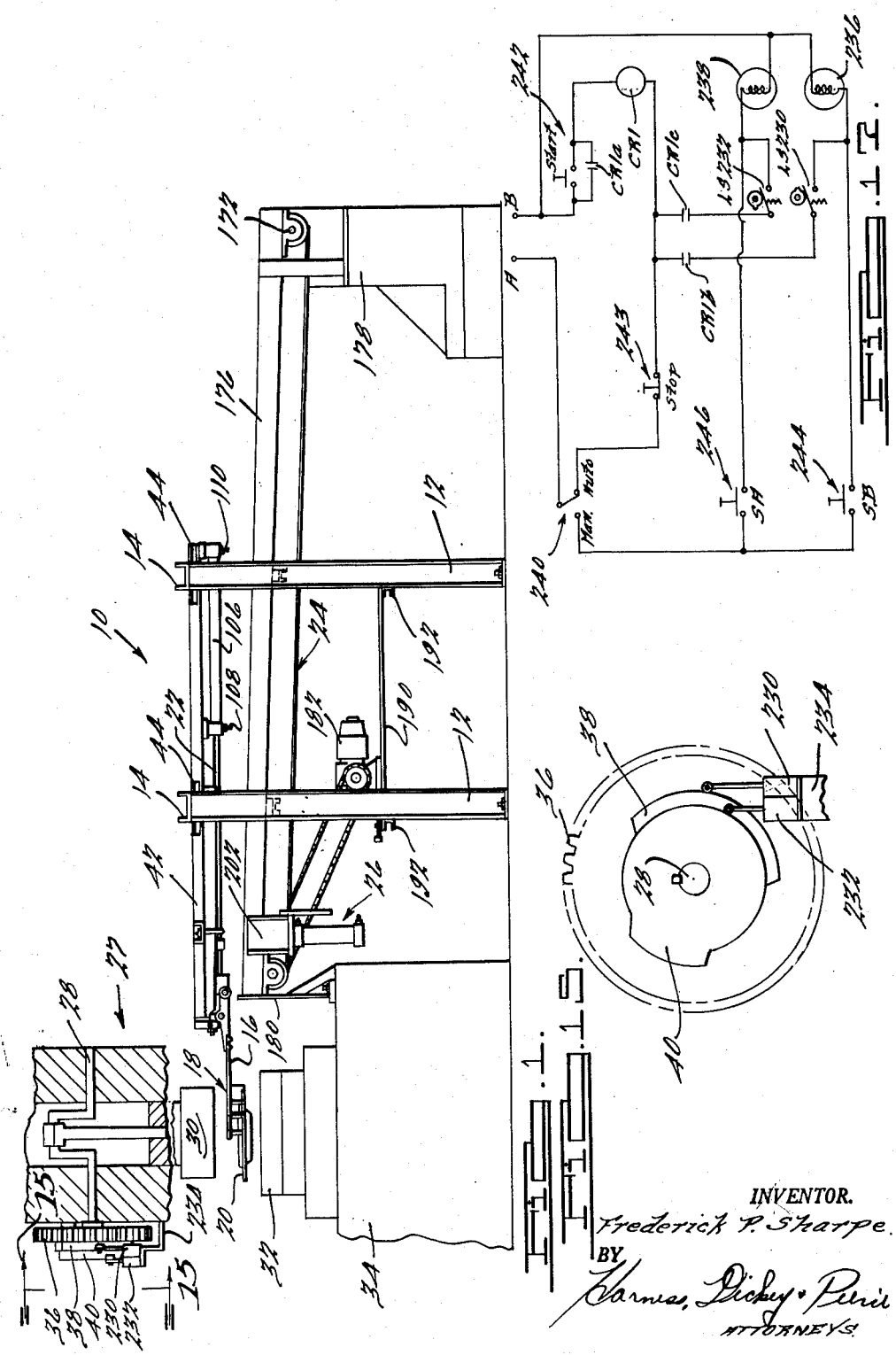

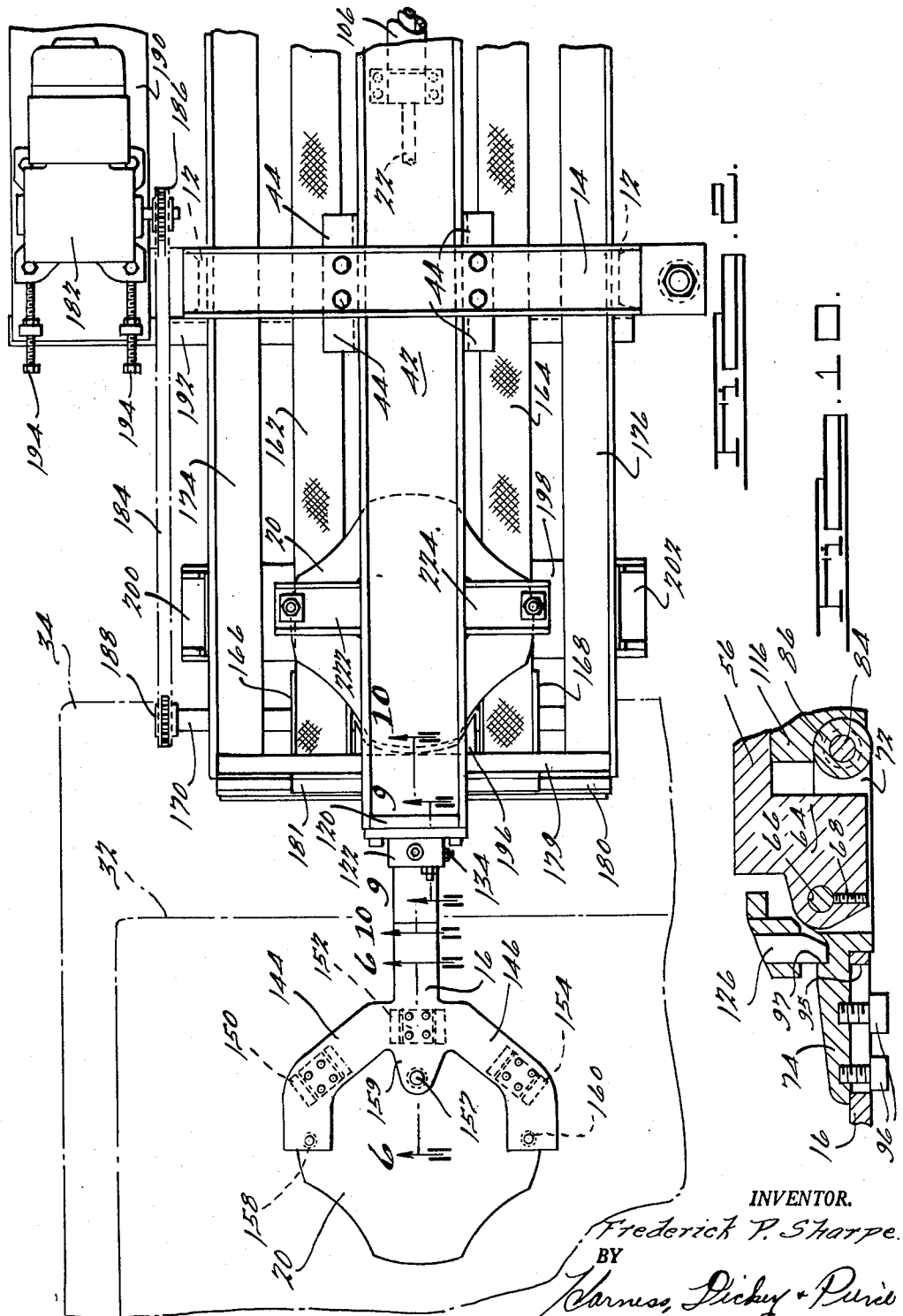

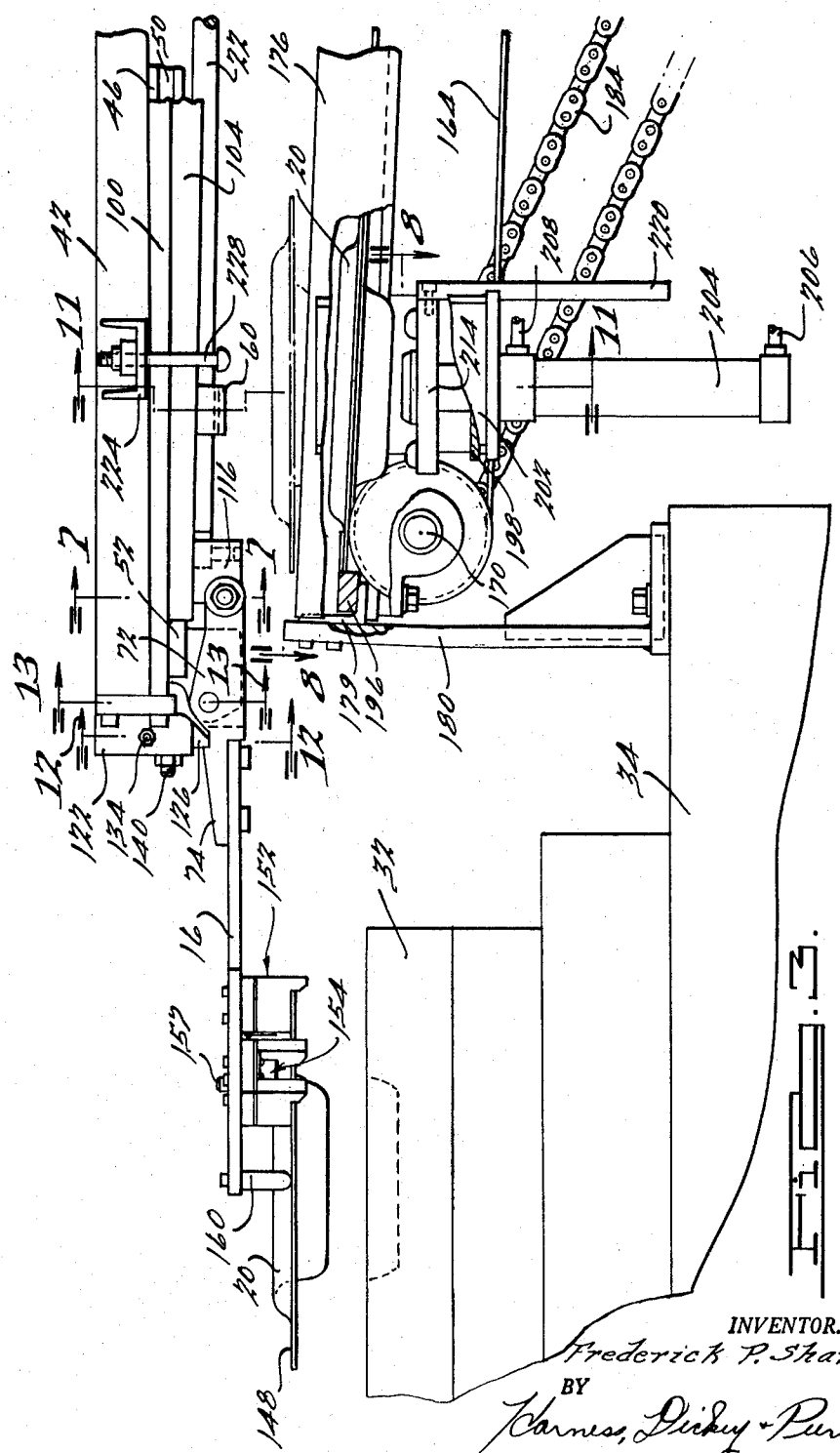

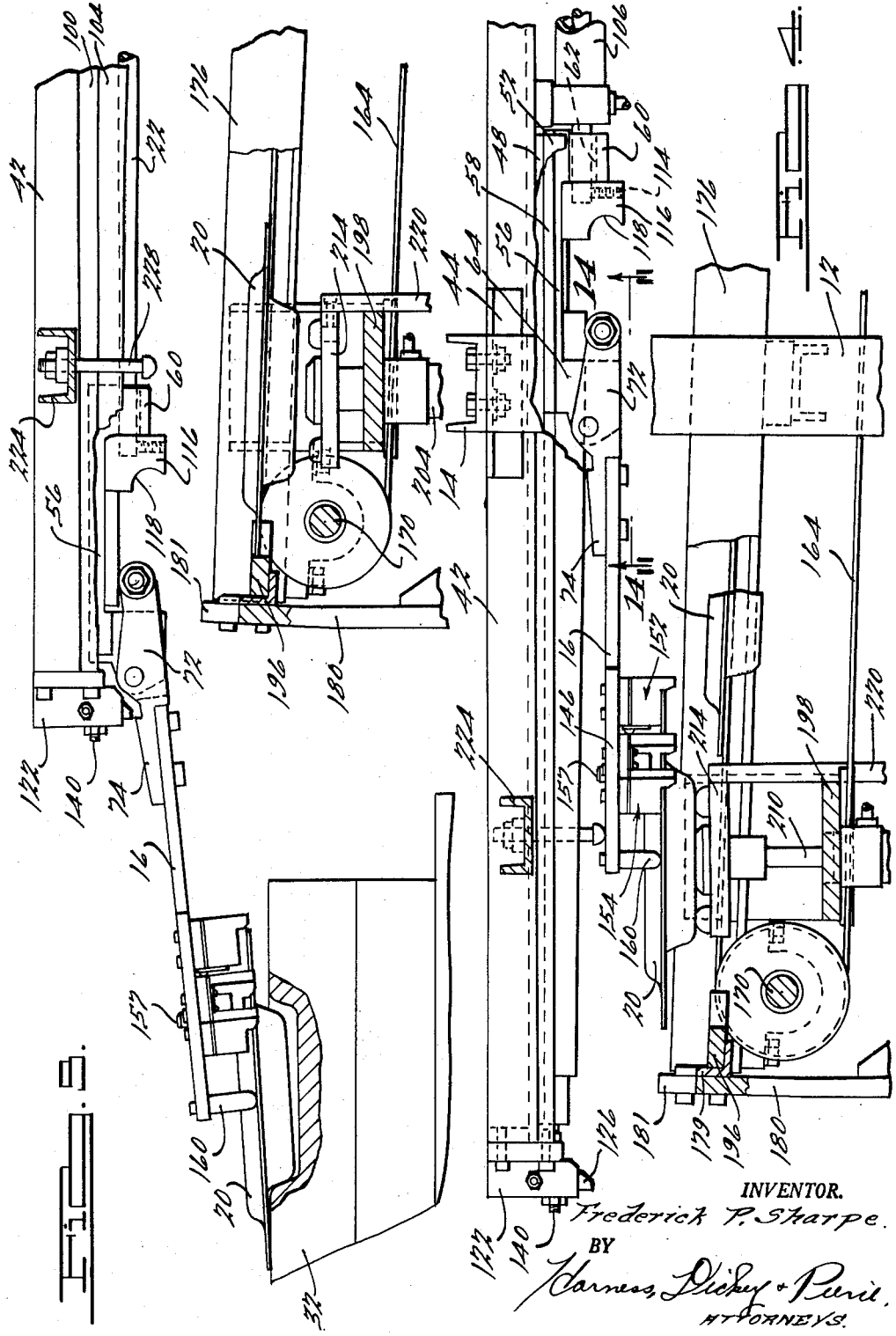

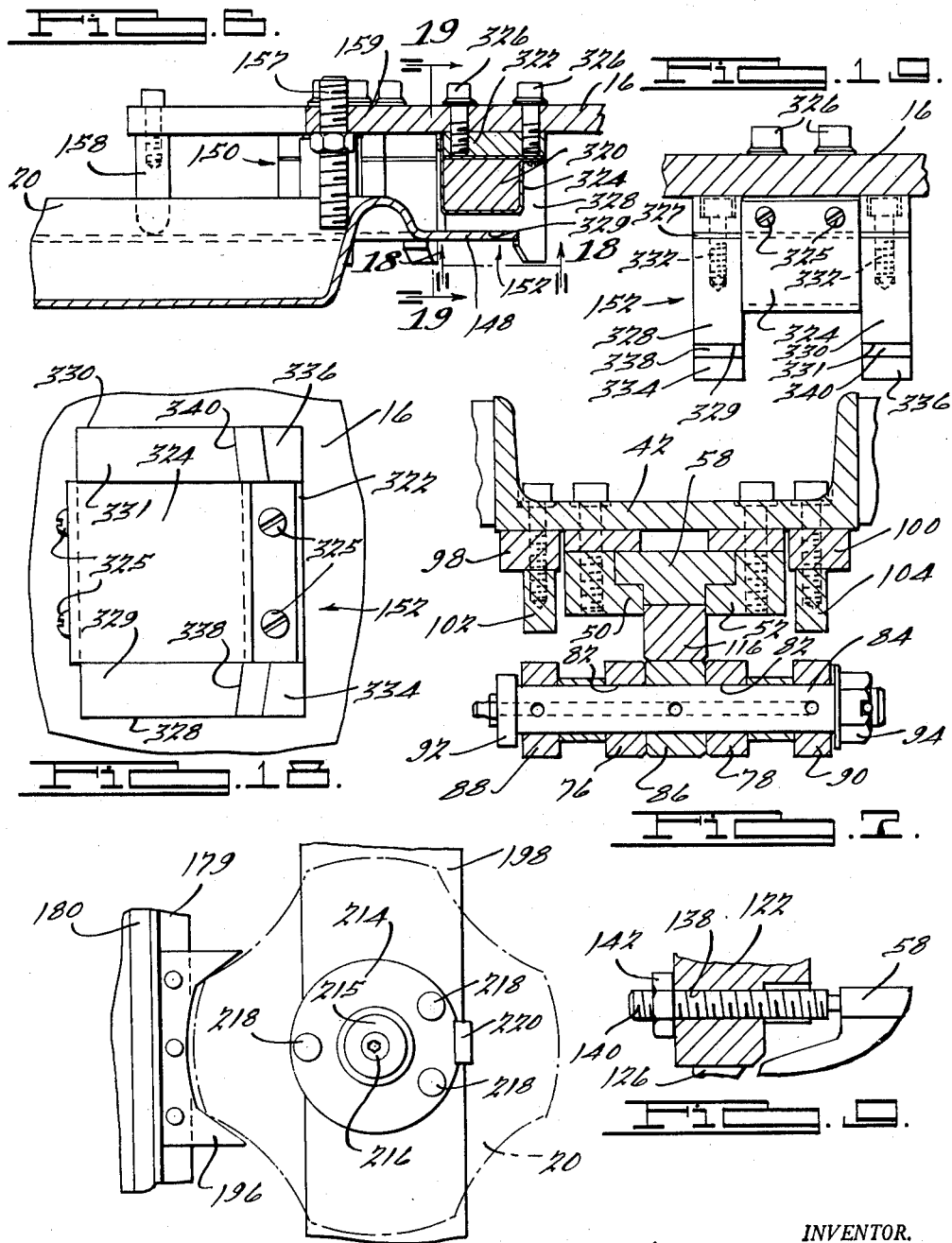

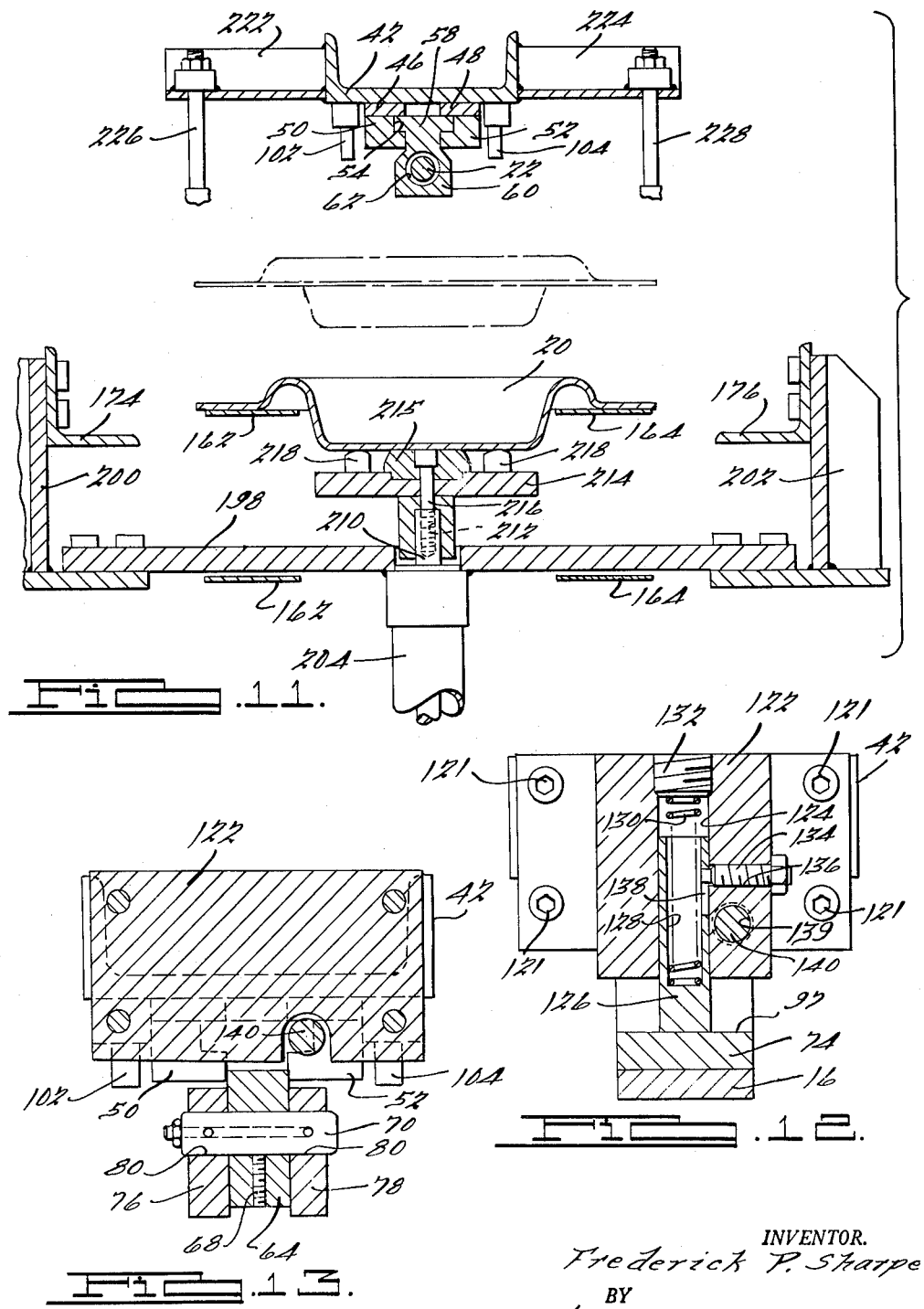

United States Patent Office 3,087,629
Patented Apr. 30, 1963

3,087,629
TRANSPORTING APPARATUS
Frederick P. Sharpe, Dearborn, Mich., assignor to Kelsey-Hayes Company, Detroit, Mich., a corporation of Delaware
Filed Dec. 16, 1960, Ser. No. 76,397
11 Claims. (Cl. 214—1)

This invention relates generally to apparatus for transporting workpieces to the die or fixture of a metal processing machine, and more particularly to a transporting apparatus utilizing permanent magnets to grasp and hold workpieces formed of iron, steel or other ferrous metals to transport and accurately position such workpieces on the die or fixture of a press or like machine.

Generally speaking, presently available equipment of the type described herein is relatively complicated in structure, particularly with respect to the gripping or holding means which are utilized to actually grasp the workpiece to be transported. Often such holding means comprise solenoid, hydraulically or pneumatically operated gripping devices having a pair of opposed jaws or clamping elements, whereby the workpiece to be held is pinched or clamped between such elements. Thus, when it is necessary to grasp a workpiece and move it for some distance, it is necessary that flexible connections be utilized between the fixed structure of the apparatus and the moving holding means so that power may be transmitted to the latter. For example, when hydraulically or pneumatically operated clamping means are utilized there must be provided suitable flexible conduits through which the hydraulic fluid or air may be carried to the clamping means, and when solenoid operated clamping means are utilized suitable wiring must be provided for the same purpose. In any case, the resulting structure is relatively complicated, if for no other reason than because of the presence of such flexible connectors or lines, between the fixed and movable portions of the apparatus. In addition, holding means utilizing opposed clamping members are of themselves relatively complicated in structure, comprising a number of movable parts which must be accurately aligned with respect to each other.

In order to partially overcome some of the disadvantages of such equipment electromagnets have been utilized as holding means in lieu of the relatively complicated structure inherent in holding means of the opposed clamping element type. The use of electromagnets thus somewhat simplifies the clamping structure, however, the necessity of providing electrical conductors between the fixed portion of the apparatus and the movable portion thereof for activating and deactivating the electromagnets is not eliminated. Hence, it is still necessary to provide flexible conductors since means must be provided for de-energizing the electromagnets to release the part held thereby at the proper time. Of course, electromagnets may be utilized only in those applications where the workpiece or part to be transported is formed of a ferrous material, such as iron, steel, or other ferrous alloy.

Another holding device used in certain special applications which eliminates the relatively complex structure associated with opposed clamping elements utilizes pneumatically controlled suction cups. In such apparatus, however, it is again necessary that there be provided flexible conductors between the fixed portion of the apparatus and the movable portion thereof so that the suction created by the suction cups to hold a workpiece may be discharged to release the workpiece at the proper time. Suction cups, of course, may be utilized only in applications where the part to be held is provided with a substantially flat surface formed of a non-porous material.

The present invention is directed to an apparatus which is generally similar to the last two types described above, but which eliminates the undesirable features thereof, namely the necessity for providing flexible conductors or lines between the stationary portion of the apparatus and the movable portion thereof. The invention is ideally suited to either of the last mentioned applications but for purposes of illustration is disclosed herein in an application wherein magnets are utilized rather than suction cups.

It is therefore a primary object of the present invention to provide a novel apparatus for transporting workpieces to the die or fixture of a metal processing machine, which apparatus is provided with extremely simple means for holding the workpieces and which functions in such a way that the workpieces may be released from the grasp of the holding means without the necessity of providing conduits, conductors, or wiring between the holding means, which is adapted for movement to and from the die or fixture, and the stationary portion of the apparatus.

Another object of the present invention resides in the provision of a novel apparatus comprising holding means including permanent magnets to grasp and hold workpieces, means for transporting workpieces so held to any desired position, and means for causing them to be released from the permanent magnets without the use of any device at the holding means which must be in any way activated, powered or controlled from the stationary portion of the apparatus, whereby positive gripping and transporting of workpieces may be effected accurately and quickly by an apparatus of relatively simple construction.

Yet another object of the present invention concerns the provision of an apparatus of the type described comprising extremely simple and novel holding means having no moving parts and no wires or conduits connected thereto, which apparatus is so designed that it may, at the desired time, quickly and effectively cause a release from the holding means of a workpiece held thereby.

A related object resides in the provision of such an apparatus wherein there is provided means for effectively and efficiently urging a workpiece from a permanent type holding means which would not otherwise by itself release a workpiece held thereby.

A further object of the present invention resides in the provision of a novel automatic apparatus comprising extremely simple holding means of very flexible utility, whereby workpieces of varying sizes and shapes may be transported to a variety of types of dies or fixtures in practically any type of machine.

These and other objects of the present invention will become apparent upon consideration of the present specification taken in conjunction with the accompanying drawings in which there are shown several embodiments of the invention by way of example, and wherein:

FIGURE 1 is a side elevational view, partly in section, of an apparatus embodying the principles of the present invention, shown in position ready to deliver a workpiece to the die or fixture of a press;

FIGURE 2 is a top plan view of a portion thereof;

FIGURE 3 is a side elevational view of a portion thereof, partly in section;

FIGURE 4 is a side elevational view of a portion thereof, partly in section, showing the apparatus in a fully retracted position;

FIGURE 5 is a side elevational view thereof, partly in section, illustrating the manner in which a workpiece is placed upon the die or fixture of a press;

FIGURE 6 is an enlarged fragmentary longitudinal section view taken along line 6—6 in FIGURE 2;

FIGURE 7 is an enlarged transverse sectional view taken along line 7—7 in FIGURE 3;

FIGURE 8 is an enlarged fragmentary top plan view taken substantially along line 8—8 in FIGURE 3;

FIGURE 9 is an enlarged fragmentary sectional view taken along line 9—9 in FIGURE 2;

FIGURE 10 is an inlarged fragmentary longitudinal sectional view taken along line 10—10 in FIGURE 2;

FIGURE 11 is an enlarged transverse sectional view taken along line 11—11 in FIGURE 3;

FIGURE 12 is an enlarged transverse sectional view taken along line 12—12 in FIGURE 3;

FIGURE 13 is an enlarged transverse sectional view taken along line 13—13 in FIGURE 3;

FIGURE 14 is an enlarged fragmentary bottom plan view looking along line 14—14 in FIGURE 4;

FIGURE 15 is an enlarged side elevational view looking along line 15—15 in FIGURE 1;

FIGURE 16 is a developed view illustrating the contour of the control cams for the apparatus;

FIGURE 17 is a schematic wiring diagram illustrating an exemplary circuit which may be utilized in the present invention;

FIGURE 18 is an enlarged bottom plan view looking along line 18—18 in FIGURE 6, with the workpiece removed;

FIGURE 19 is an enlarged fragmentary sectional view taken along line 19—19 in FIGURE 6;

FIGURE 20 is a fragmentary diagrammatic view illustrating a modification of the exemplary embodiment disclosed in FIGURES 1 through 19;

FIGURE 21 is a fragmentary diagrammatic view illustrating the apparatus having a modified mode of operation; and FIG. 22 is a fragmentary diagrammatic view illustrating the apparatus having another modified mode of operation.

Broadly speaking, the disclosed embodiment of the present invention comprises a base structure, a reciprocating arm adapted to advance to and retract from the die or fixture of a press or like machine, holding means on the arm for holding a workpiece presented thereto, feed means for presenting a workpiece to the holding means when the arm is retracted, and means operatively associated with the arm for urging a workpiece held by the holding means from the hold thereof when the arm is advanced and the workpiece positioned at the die or fixture. In the embodiment disclosed herein the holding means comprises a plurality of permanent magnets.

Referring more particularly to the drawings, there is illustrated in FIGURE 1, at 10, an exemplary embodiment of the present invention comprising a frame structure including vertically upstanding frame members 12 and horizontal transversely extending frame members 14 secured thereto across the upper ends thereof. As will be more fully described hereinafter, there is supported from frame members 14 for longitudinal movement a reciprocating arm 16 having disposed on the outer free end thereof holding means, generally indicated at 18, for supporting a workpiece 20. Motor means in the form of a hydraulically or pneumatically actuated ram 22 is provided for reciprocating the arm 16. In addition, there is supported from the frame structure an endless belt conveyor, generally indicated at 24, for supplying workpieces to a feed means 26 for presenting workpieces to the holding means 18 on the reciprocating arm 16 when the latter is in its fully retracted position, as seen in FIGURE 1.

The entire transporting apparatus 10 of this embodiment is positioned adjacent a conventional press 27 comprising a crankshaft 28 for vertically reciprocating a ram 30 against a die or fixture 32 supported upon a base 34. The apparatus 10 is so positioned that the reciprocating arm 16 may present a workpiece to the die or fixture 32, so that it may be punched, cut, or otherwise worked in any desired manner by ram 30. Press 27 is provided with a driving gear 36 for rotating crankshaft 28, and on the outer face of driving gear 36 or otherwise secured to crankshaft 28 is a drum controller comprising cams 38 and 40, to be described in detail hereinafter. In FIGURE 1 the upper section portion of the press is shown rotated 90° from its actual position, for purposes of illustration.

Considering in greater detail the manner in which reciprocating arm 16 is mounted and operated, there is provided a longitudinally extending mounting beam 42 rigidly secured to the bottom of transverse frame members 14 by means of suitable angle brackets 44. Rigidly secured to the lower surface of mounting beam 42 are a pair of longitudinally extending spacers 46 and 48 to which are secured a pair of longitudinally extending guide members 50 and 52, respectively. The juxtaposed edges of guide members 50 and 52 are suitably grooved to define a longitudinally extending T-shaped slot 54 therebetween. Mounted for longitudinal sliding movement within T-shaped slot 54 is a slide member 56 which serves as a lost-motion connecting member between ram 22 and arm 16 as can be seen in FIGURES 4 and 5.

Slide member 56 is provided along the upper edge thereof with a T-shaped portion 58 adapted to fit within T-shaped slot 54 for sliding movement in the longitudinal direction only. The lower edges of spacers 46 and 48 serve to retain T-shaped portion 58 within T-shaped slot 54, as best seen in FIGURE 11. Depending from the rearward end of T-shaped portion 58 and formed integrally therewith is a collar 60 having a longitudinally disposed aperture 62 therethrough. Integrally formed at the forward end of T-shaped portion 58 is a downwardly extending projection 64 having a transversely extending aperture 66 therethrough, as seen in FIGURE 10. Rigidly secured within aperture 66, as by means of a set screw 68, is a transversely extending pivot pin 70 on which is pivotally supported a mounting bracket 72.

As best seen in FIGURES 4, 7, 13 and 14, mounting bracket 72 is provided at its forward end with a tongue portion 74 and integrally therewith at its rearward end with a bifurcated portion defining a pair of rearwardly extending legs 76 and 78, having therethrough transversely extending apertures 80 and 82. The entire mounting bracket is mounted for pivotal movement by means of pivot pin 70 which is rotatably disposed within transverse aperture 80. Rotatably disposed within transverse aperture 82 is a pivot pin 84 having rotatably mounted thereon, between legs 76 and 78, a bushing 86. At the outer ends of pivot pin 84 there are provided roller followers 88 and 90, spaced from legs 76 and 78 by suitable spacers. Pivot pin 84 is maintained in position by means of a shoulder 92 at one end thereof and a nut 94 at the opopsite ends thereof. Reciprocating arm 16, to be described in detail hereinafter, may be secured to the lower surface of tongue portion 74 by means of a pair of machine screws 96 passing through a longitudinal slot 95 in the reciprocating arm and threadably engaging tongue portion 74. On the upper surface of tongue 74 there is provided a transversely extending notch 97.

Also secured to the lower surface of mounting beam 42, as by means of mounting rails 98 and 100, are a pair of longitudinally extending cams 102 and 104. Cams 102 and 104 are each provided with a longitudinally inclined lower cam surface which extends gradually downwardly and rearwardly along the length thereof. It is these cams which roller followers 88 and 90 are adapted to engage. Thus, when mounting bracket 72 is fully advanced and roller followers 88 and 90 are engaging cams 102 and 104, respectively, the reciprocating arm 16 is in an advanced tilted position, inclining forwardly and downwardly as best seen in FIGURE 5. When the mounting bracket is retracted, however, the action of cams 102 and 104 on roller followers 88 and 90 causes the mounting bracket to be pivoted in the clockwise direction to thereby raise the reciprocating arm 16 to a level or horizontal position when the mounting bracket is fully retracted, as seen in FIGURE 4.

To reciprocate the arm 16, there is provided motor means in the form of a pneumatically or hydraulically actuated cylinder 106 mounted upon the lower surface of mounting beam 42 at the rearward end thereof. Cylinder 106 is provided with inlet and outlet lines 108 and 110 for reciprocating the piston therein (not shown) to which is secured the ram 22. Ram 22, adapted for reciprocating movement in the longitudinal direction, extends through longitudinal aperture 62 in collar 60 and is provided at its forward end, by means of a set screw 114, with a pusher member 116. Ram 22 is of a smaller diameter than aperture 62 so as to be freely reciprocable therein, and is thus adapted for free reciprocating movement relative to slide member 56. Pusher member 116 is provided at its upper edge with a flat surface adapted to slidingly engage a flat surface along the lower edge of T-shaped portion 58 to prevent rotation of the pusher member about a longitudinal axis. In the forward face of pusher member 116 there is provided a transversely extending notch 118 of generally circular cross section, adapted to engage bushing 86 on pivot pin 84.

The notch 118, as best seen in FIGURES 4 and 5, is so shaped and positioned that when the ram is advanced it will engage bushing 86 to advance mounting bracket 72, while at the same time maintaining the latter in a horizontal position, not allowing roller followers 88 and 90 to engage cams 102 and 104. Thus is achieved by locating the axis of circular notch 118 slightly to the rear of the forward face of pusher member 116 so that a portion of the pusher member overhangs the top center of the bushing. When the ram is retracted, the pusher member will retract also, but will not move mounting bracket 72 until it engages the forward surface of collar 60 on slide member 56. Thus, while this lost motion or slack is being taken up, the mounting bracket 72 will remain in the advanced position, but since circular notch 118 no longer engages bushing 86 the reciprocating arm 16 will be allowed to drop or tilt until the roller followers on the mounting bracket engage the cams, as best seen in FIGURE 5.

At the forward end of mounting beam 42 is rigidly secured a front end wall 120, to the forward face of which is secured, as by machine screws 121 or the like, a latch housing 122. As best seen in FIGURE 12, latch housing 122 is provided with a vertically extending bore 124 in which is slidably disposed a latch member 126 having a bore 128 therein at the upper end thereof. Disposed within bore 128 is a compression spring 130 which abuts at its upper end a plug 132 secured within bore 124 for biasing the latch member 126 in a downward direction to engage the transverse notch 97 in mounting bracket 72, to prevent the rearward or retracting movement thereof when the mounting bracket is in a horizontal position, as shown in FIGURE 3. The downward movement of latch member 126 is limited by means of a set screw 134 which is threadably engaged in a transverse aperture 136 in the housing and which projects through an elongated slot 138 in the latch member 126. As can be seen in FIGURES 3 and 5, when the mounting bracket is in a horizontal position, rearward movement thereof is prevented by latch member 126, but when the mounting bracket is tilted, rearward movement thereof is no longer prevented by the latch member because the latter is no longer engaging notch 97, its downward movement being limited by set screw 134.

Latch housing 122 is also provided with a longitudinally extending threaded opening 139 in which is threadably mounted an adjustable stop 140, as best seen in FIGURES 9, 12 and 13. The adjustable stop 140 is provided to adjustably limit forward movement of slide member 56, and hence mounting bracket 72, and as can be seen is adapted to abut the forward edge of the T-shaped portion 58 of the slide member. To lock adjustable stop 140 there is provided a lock nut 142 thereon.

In FIGURES 2, 3, and 6 there is clearly illustrated the reciprocating arm 16. As can be seen, the forward end of arm 16 is yoke-shaped, defining arms 144 and 146 on which are mounted the holding means for grasping and holding a workpiece 20. For purposes of description the workpiece 20 to be transported by the embodiment disclosed herein is of generally dish-like configuration, having a radially extending horizontal flange 148. In this embodiment, the holding means comprises three permanent magnet assemblies, generally indicated at 150, 152 and 154, rigidly secured to the lower surface of reciprocating arm 16 in the positions illustrated in FIGURE 2. As will be apparent, this positioning of the permanent magnet assemblies may be varied to suit any shape or size workpiece, so long as certain design considerations, to be described hereinafter, are accounted for.

Since all of the magnets utilized in this embodiment are identical, the details of construction thereof will be described with reference to permanent magnet assembly 152, best illustrated in FIGURES 6, 18 and 19. Each permanent magnet assembly comprises an elongated permanent magnet 320 of rectangular cross section. The poles of the magnet are positioned at the opposite ends thereof, and are, of course, of opposite polarity. Each of the magnets is secured to a spacer plate 322 by means of a strap 324 encompassing three sides of the permanent magnet and being affixed to spacer plate 322, as by screws 325. The strap should be formed of a suitable non-magnetic material, such as austenitic stainless steel, brass, copper, aluminum or the like. In addition, the entire lower surface of spacer plate 322 should be insulated from the magnet by a suitable magnetic insulating material 327, such as any of the above mentioned non-magnetic materials, so that the leakage of magnetic flux from the magnet may be minimized. The spacer plate may be mounted upon arm 16 by means of suitable machine screws 326. To the two poles or end faces of magnet 320 are positioned locating members 328 and 330, each formed of a ferrous material and located so as to abut one of the pole faces of the magnet. Each of the locating members is secured to spacer plate 322 by means of suitable non-magnetic countersunk machine or cap screws 332, and serves as an extension of the pole of the magnet with which it is associated. In addition, locating members 328 and 330 are provided with flat bottom surfaces 329 and 331, respectively, from which project stop members 334 and 336, respectively, having rearwardly diverging vertical faces 338 and 340 thereon. Vertical faces 338 and 340, in conjunction with the flat lower surfaces 329 and 331, serve to maintain a workpiece 20 in the proper position, these surfaces engaging the peripheral edge of flange 148 to prevent longitudinal or transverse movement of a workpiece relative to reciprocating arm 16.

As will be apparent, locating members 328 and 330 serve as extensions of the poles of the permanent magnet, so that when a workpiece of ferrous material is positioned across the lower faces of the locating members a complete magnetic circuit will be established, to firmly hold the workpiece against the locating members. Variations may, of course, be made in the shape and size of locating members 328 and 330 so that workpieces of varying sizes and shapes may be held. In addition, any number of these permanent magnet assemblies may be utilized, depending on the size, shape, and weight of the workpiece.

At the outer free ends of legs 144 and 146 there are provided downwardly extending projections 158 and 160, respectively, each of which is adapted to engage the upper surface of flange portion 148 on the workpiece. It is the purpose of these projections to serve as pivot means about which the workpiece may pivot away from the holding means when an upwardly directed force is applied to the forward edge of the workpiece. In this embodiment this is achieved by tilting the reciprocating arm 16 downwardly when it is fully advanced until the die or fixture engages the forward end of the workpiece to pivot it about the projections away from the permanent magnets, to thereby position the workpiece on the die or fixture. This principle of operation may, of course, be effected by many different arrangements of parts, however certain considerations must be followed in any case. One of the features of the present invention resides in this principle of operation by which workpieces are separated from a holding means which is in no way itself activated or operated to release a workpiece held thereby. In other words, this principle is applicable where the holding means is permanent or fixed in its mode of operation, as distinguished from one which may be opened, deenergized, or otherwise operated to itself effect the release of a workpiece held thereby. Examples of such permanent type holding means are permanent magnets, non-controlled suction cups, and the like. One of the characteristics of such holding means utilized by the present invention is their ability to hold a workpiece by the engagement thereof with a single substantially flat surface on the latter, as distinguished from two opposed surfaces such as would be engaged by a conventional clamp. Flatness is, of course, a matter of degree. When suction cups are used flatness is relatively important, but when permanent magnets are used the importance of flatness diminishes. In any case, the holding means will grasp a workpiece by engagement with a single surface on the latter.

In its broader aspects, this principle of operation contemplates the provision of holding means for grasping and holding a workpiece adjacent one side thereof, and projection means engaging the workpiece intermediate this side and the opposite side thereof, so that a force applied to the workpiece at the opposite side thereof will cause it to pivot on the projection away from the holding means. The holding means and projections may be arranged in any appropriate manner, depending on the size and shape of the workpiece to be held, so long as the projection or projections lie in a transverse plane positioned between the point on the workpiece engaged by the holding means and the point on the workpiece against which the releasing force is applied. With this principle in mind, the arrangement of parts for any given application will be apparent.

Consideration will now be given to the apparatus utilized to supply workpieces to the holding means when the reciprocating arm is fully retracted. Conveyor 24 comprises two endless belts 162 and 164 mounted for rotation at the forward end about pulleys 166 and 168, respectively, on a shaft 170, and at the rearward end upon suitable pulleys rotatably mounted upon a shaft 172. Shafts 170 and 172 are rotatably supported in suitable bearings mounted to the lower edges of a pair of generally longitudinally extending L-shaped members 174 and 176. Members 174 and 176 are supported at the rearward end by means of suitable support structure 178, and at the forward end by means of a transversely extending angle bracket 179 secured to a vertically extending mounting plate 180 on the base 34 of press 27. Both angle bracket 179 and mounting plate 180 are cut away, as at 181, so as not to interfere with the forward movement of a workpiece 20.

The conveyor 24 is driven by a suitable electric motor 182 by means of an endless drive chain 184, driven by a sprocket 186 on the drive shaft of the motor and engaging a sprocket 188 on shaft 170. Motor 182 is supported upon a platform 190 secured to vertically upstanding frame members 12 by means of suitable cross members 192 secured thereto. Adjusting screws 194 are provided to adjust the tension of chain 184. FIGURES 2 and 3 clearly illustrate the manner in which workpieces 20 are carried by the conveyor belts, with the flange portion 148 supported by the belts and the dished portion depending therebetween. Workpieces are continuously deposited at the rearward end of the conveyor belts in any desired manner and are carried by the belts to the forward end thereof where the forwardmost workpiece will engage a stop member 196, mounted on angle bracket 179 between members 174 and 176, as best seen in FIGURE 8. The conveyor is adapted to move continuously and stop 196 serves to properly locate a workpiece in a position from which it may be accurately presented to the holding means on the reciprocating arm when the latter is retracted.

Feed means 26 serves the purpose of elevating the foremost workpiece on conveyor 24 into the grasp or hold of the holding means on the reciprocating arm when the latter is in the fully retracted position, as illustrated in FIGURE 4. Feed means 26 comprises a transversely extending mounting plate 198 mounted at opposite ends upon brackets 200 and 202 supported by longitudinal members 174 and 176, respectively. A pneumatic or hydraulic cylinder 204 is secured to the lower surface of mounting plate 198 and is provided with inlet and outlet lines 206 and 208, and a piston (not shown) to which is attached a vertically movable connecting rod 210 having a threaded bore 212 in the upper end thereof. Rigidly secured to the upper end of connecting rod 210 is a supporting disk 214 having a hub 215 thereon and held in position by means of a threaded bolt 216 disposed in threaded bore 212, as best seen in FIGURE 11. Affixed to the upper surface of supporting disk 214 are a plurality of lugs 218 for supporting a workpiece 20. The size, shape and number of the lugs 218 are determined by the configuration of the workpiece to be elevated, and in this embodiment only three such lugs terminating in a common horizontal plane are satisfactory. To the rearward peripheral edge of supporting disk 214 is rigidly secured a vertically extending stop bar 220 which is adapted for vertical movement with the supporting disk and which is guided for such movement in a rectangular notch in the rearward edge of mounting plate 198, as can be visualized in FIGURE 8. Bar 220 serves as a stop member to prevent further continued movement of a workpiece by the belts when the supporting disk is in the elevated position, to prevent a workpiece from becoming positioned beneath the supporting disk to thereby interfere with the downward displacement thereof.

In operation, a workpiece is fed by the conveyor belts until it is in an abutting relationship with stop member 196, whereupon the cylinder 204 will be activated to cause the supporting disk to move upwardly against the bottom of the workpiece to elevate it into the magnetic field of the permanent magnets constituting the holding means. This operation takes place when the reciprocating arm is fully retracted as seen in FIGURE 4. The relative positions of arm 16 and the feed means is such that straight vertical displacement of the workpiece will locate it in a proper position with respect to the holding means. Since the arm is mounted for pivotal movement it is necessary to provide back stop means to keep the upwardly moving workpiece from urging the arm 16 upwardly and hence out of proper alignment. As best seen in FIGURE 11, this back stop means comprises a pair of outwardly transversely extending arms 222 and 224 secured at their inner ends to mounting beam 42 and provided at the outer ends with downwardly extending back stop members 226 and 228, respectively. The back stop members are spaced so as to engage legs 144 and 146, respectively, of the reciprocating arm, as seen in FIGURES 4 and 11, when a workpiece is urged upwardly against the holding means thereon. In FIGURE 4 the supporting disk is shown in an elevated position with stop bar 220 preventing further forward movement of the next workpiece positioned on the conveyor.

Consideration will now be given to the operating cycle of the above described embodiment. To effect this cycle there may be provided a control system as schematically illustrated in FIGURE 17. In order to tie the operating cycle of the apparatus to the operating cycle of the press there is utilized a drum controller driven by the crankshaft of the press, comprising cams 38 and 40, as described above. These cams are adapted to trip limit switches 230 and 232, respectively, both of which are secured to the supporting structure of the press by means of a suitable bracket 234, as best seen in FIGURE 1. An exemplary configuration of the cams is illustrated in FIGURE 15, wherein cam 38 is adapted to effect the longitudinal reciprocating movement of arm 16 and cam 40 the vertical reciprocating movement of the supporting disk 214.

Referring to FIGURE 17, the circuitry for this embodiment includes limit switches 230 and 232, and a pair of solenoids 236 and 238 for controlling cylinder 106, to reciprocate the arm, and cylinder 204, to reciprocate the supporting disk, respectively. This control may be effected in any conventional manner, such as by utilizing solenoid actuated valves to control the flow of fluid to the respective cylinders. Solenoids 236 and 238 could thus be used to directly actuate suitable valves. Referring more particularly to the circuitry shown in FIGURE 17, power would be applied to the circuit across terminals A and B. A switch 240 is provided to condition the circuit for either automatic or manual operation, and when in the "automatic" position, as shown, the circuitry is placed under the control of a start switch 242 which, when closed, serves to activate a control relay CR1 which in turn closes switches CR1b and CR1c and a holding switch CR1a to maintain the circuit energized after start switch 242 is released. The circuit at this point is energized and is subject to the control of the drum controller. Thus, when limit switch 232 is closed by cam 40 solenoid 238 will be activated to cause the piston within cylinder 204 to raise the supporting disk 214, thereby presenting a workpiece to the holding means. When limit switch 230 is closed by cam 38 solenoid 236 is energized to cause cylinder 106 to move the ram 22 in the forward direction to position a workpiece in the die or fixture 32 of the press. The control circuit may be deenergized and the apparatus turned off by the opening of a normally closed manually operable stop switch 243 which will cause control relay CR1 to release to open switches CR1a, CR1b and CR1c. The specific operating cycle and sequence of operation will be discussed in detail hereinafter. When it is desired to put the apparatus under manual control, switch 240 is moved to the "manual" position thus putting solenoid 236 under the control of a manually operable switch 244 for reciprocating arm 16, and solenoid 238 under the control of a manually operable switch 246 for raising and lowering the supporting disk 214.

At the beginning of an operating cycle, or when the system is inactive or at rest, the press ram 30 is at the top of its stroke, the arm 16 is fully retracted, the holding means is empty, the supporting disk 214 is fully lowered, limit switches 230 and 232 are open, and solenoids 236 and 238 are in the "retract" and "down" positions, respectively. To initiate operation of the system, the press motor (not shown) is started, motor 182 is energized to start the movement of conveyor 24, and switch 240 is put in the "automatic" position. At this point the press ram 30 will still be in its fully raised position since its movement is controlled by the circuitry associated with the press itself. The start switch 242 is then closed to energize the circuitry associated with the transporting apparatus. The entire system is now ready for automatic operation. Assuming that there are a suitable number of workpieces positioned on the conveyor 24 and that there is a workpiece 20 positioned on the die or fixture 32, the operating switch on the press is closed to start the rotation of crankshaft 28 to lower the press ram 30. The top dead center position of the crank corresponds to the 0° point on cams 38 and 40, the profiles of which are developed in FIGURE 16. As the ram 30 moves downwardly to punch, bend, or otherwise work the workpiece disposed within the die or fixture 32, cam 40 activates limit switch 232 to cause supporting disk 214 to raise the forwardmost workpiece on conveyor 24 upwardly into the grasp of the holding means 18, which comprises permanent magnets in this embodiment. This position of the apparatus is clearly illustrated in FIGURE 4 and occurs between points a and b in FIGURE 16, when solenoid 238 is maintained in an "up" position, after which solenoid 238 is deenergized to cause cylinder 104 to lower supporting disk 214 into a position to receive the next workpiece on the conveyor, which workpiece has been maintained in a non-interfering position by its abutment against stop bar 220. The ram 30 continues its uninterrupted downward movement to its bottom dead center position whereat it performs the necessary operations upon the workpiece then in position in die or fixture 32. Since the rotation of crank 28 is continuous for at least 360° in any given cycle, ram 30 will then start its upward return stroke.

As the ram 30 progresses upwardly the workpiece then in die or fixture 32 is ejected or otherwise removed therefrom by any conventional apparatus (not shown). Continued rotation of crankshaft 28 causes cam 38 to trip limit switch 230, whereupon cylinder 106 will be activated to cause ram 22 to advance. This point in the cycle, when solenoid 236 is energized to the "advance" position, is indicated at point c in FIGURE 16. The advancing movement of ram 22 causes pusher member 116 to move from the position illustrated in FIGURE 4 forwardly until notch 118 engages bushing 86 on mounting bracket 72 to cause the latter to begin its forward advancing movement. Since the center of notch 118 is positioned slightly rearwardly of the forward edge of the pusher member, when it is engaged with bushing 86 upward movement of the latter is prevented. Thus, the mounting bracket 72 is prevented from rotation in the counter-clockwise direction as seen in FIGURES 3 and 4, so that as it advances roller followers 88 and 90 will remain at the same level, while the cam surfaces on cams 102 and 104 will become gradually spaced upwardly therefrom. As the mounting bracket reaches its fully advanced position the upper surface of tongue 74 cams latch member 126 upwardly so that when the mounting bracket is in its fully advanced position the latch member 126 will be engaged in notch 97, to prevent rearward movement of the mounting bracket. The transporting apparatus should be so positioned with respect to the press that when the mounting bracket and reciprocating arm 16 are fully advanced, the workpiece held thereby will be in substantially vertical alignment with die or fixture 32. As noted above, fine adjustments of the precise stopping point of the mounting bracket may be made by means of the adjustable stop 140. The point at which the workpiece reaches the fully advanced position is indicated at d in FIGURE 16.

Continued rotation of crankshaft 28 causes cam 38 to open limit switch 230 to deenergize solenoid 236 into the "retract" position to start the retracting movement of ram 22. Since mounting bracket 72 is prevented from rearward movement because of the engagement therewith by latch member 126, pusher member 116 moves rearwardly relative to slide member 56. When notch 118 has moved out of engagement with bushing 86, there remains nothing to prevent counter-clockwise rotational movement of mounting bracket 72 due to the force of gravity. Thus, arm 16 will tilt downwardly until roller followers 88 and 90 engage cams 102 and 104, respectively, as best seen in FIGURE 5. One important feature of this invention resides in the manner in which the workpiece is removed from the holding means, and this is accomplished by means of this tilting motion of arm 16, in this embodiment. Accordingly, as can be seen in FIGURE 5, the downward tilting movement of arm 16 causes the forwardmost edge of workpiece 20 to engage the upper surface of die or fixture 32 to cause the workpiece to be pivoted about projections 158 and 160 away from the permanent magnets constituting the holding means, whereupon the workpiece may drop into place upon the die or fixture.

When the mounting bracket 72 rotates or tilts in this manner it becomes free of the restraining force of latch member 126, so that when pusher member 116 has taken up the lost motion or slack within slide member 56 and moved into engagement with the forward face of collar 60, as shown in FIGURE 5, further retraction of ram 22 causes the retraction of the slide member, the mounting bracket, and the reciprocating arm. As the mounting bracket 72 retracts, the engagement of roller followers 88 and 90 with cams 102 and 104, respectively, causes the mounting bracket to be pivoted in the clockwise direction until, when it reaches the fully retracted position, it is disposed in a substantially level plane, as seen in FIGURE 4. At this point the apparatus is ready to begin another cycle.

Since the press utilized is so arranged that it must be manually started for each stamping cycle, when the ram 30 reaches top dead center, crankshaft 28, and hence cams 38 and 40, will stop rotating. Thus, because limit switch 230 will be in the "retract" position, ram 22 will fully retract before the next cycle begins. However, if the press is wired for continuous cycling, then as can be seen in FIGURE 16, the ram 22 may not be fully retracted before the ram 30 begins its downward stroke, simply due to the time lag after point $d$ during which it takes ram 22 to move from its fully advanced to its fully retracted position. In actual operation the movement of ram 22 is very quick and its timing is not particularly critical, so long at it is out of the way of the press ram 30 when it descends and so long as it is fully retracted when a workpiece is presented thereto by the feed means.

The above described operating cycle can be easily modified for applications in conjunction with machines other than presses, where slightly different problems are encountered. Such modifications will be obvious to those skilled in the art familiar with the principles of the present invention. Similarly, obvious modifications may be made to the specific structural arrangement of the holding means for different size and shape parts. For example, there is illustrated in FIGURE 20 an arrangement wherein projections 158 and 160 are maintained in the same position relative to arm 16 as above, but wherein the permanent magnets are disposed forwardly of the projections instead of rearwardly thereof. In such a modification, separation of the workpiece from the magnets would be achieved in exactly the same manner as in the previously described embodiment. However, in order to insure that the rearward edge of the workpiece will engage the die or fixture 32 first, it is necessary that the forward end of reciprocating arm 16 be bent upwardly in the manner illustrated. Arm 16 would have to be bent a sufficient amount, for the particular workpiece being handled, to prevent the magnets from engaging the workpiece when the arm 16 is retracted.

In FIGURES 21 and 22 there is illustrated an arrangement of parts embodying the principles of the present invention having a modified mode of operation. In these embodiments separation of the workpiece from the holding means may be effected without tilting the reciprocating arm 16 when it is fully advanced, thus eliminating the need for much of the structure existing in the above primary embodiment. Thus in FIGURE 21, the permanent magnets are arranged forwardly of the projections in the manner illustrated in FIGURE 20 so that when the reciprocating arm 16 advances the rearward edge of the workpiece will engage the die or fixture 32 to pivot the workpiece from the permanent magnets, whereupon it may drop into position upon the die or fixture. As can be seen in FIGURE 21, because of the relative positions of the several parts of apparatus, this separation may be effected by straight longitudinal movement of the reciprocating arm 16, no tilting thereof being necessary.

In FIGURE 22 is shown a modified bent reciprocating arm 16 adapted to support the permanent magnets to one side of the longitudinal axis thereof, and the projections substantially on the axis. Separation of the workpiece from the permanent magnets is effected by straight longitudinal movement of the arm 16, without any tilting thereof, by means of an abutment 300 adapted to engage the side edge of the workpiece opposite the edge held by the magents. Depending on the size and shape of the workpiece to be handled, the abutment 300 may be either permanent or movable in each operating cycle so that any problem of interference between the abutment 300 and the workpiece as it drops into position on die or fixture 32 will be eliminated.

Another possible modification would involve locating the magnets in the embodiment illustrated in FIGURES 1 through 19 in the manner shown in FIGURE 22, without changing anything else. Such a modification might be useful for workpieces having an unusual shape, and separation would be effected by the engagement of one of the side edges of the workpiece with the die or fixture, rather then the forward edge thereof, when arm 16 was tilted.

The principle by which workpieces are separated from permanent type holding means by the present invention is fully applicable to applications utilizing independent suction cups which cannot be deenergized each cycle of operation. In any case, it is only necessary that the holding means engage the workpiece adjacent one edge thereof and that projections engage the workpiece between that edge and the opposite edge, which must be so positioned that it will engage a portion of the press or the die or fixture to cause the workpiece to be pivoted about the projections away from the holding means and onto the die or fixture.

Thus there is disclosed in the above description and in the drawings several exemplary embodiments of the present invention which fully and effectively accomplish the objects thereof. However, it will be apparent that variations in the details of construction may be indulged in without departing from the sphere of the invention as herein described, or the scope of the appended claims.

I claim:

1. Apparatus for transporting a workpiece to the die or fixture of a press or the like, comprising: reciprocating arm means adapted to advance to and retract from the die or fixture of a press or the like; motor means for advancing and retracting said arm means; holding means on said arm means for holding a workpiece presented thereto, said holding means being adapted to hold a workpiece by the engagement thereof with a single surface of the latter; feed means for presenting a workpiece to said holding means when said arm means is retracted; and a projection on said arm means adapted to engage a workpiece held by said holding means at a point between that single surface of the workpiece and an edge of the workpiece spaced therefrom, whereby when said arm means is advanced the edge of the workpiece will engage the die or fixture to pivot the workpiece on said projection away from said holding means to thereby position it on the die or fixture.

2. Apparatus for transporting workpieces formed of ferrous material to the die or fixture of a press or the like, comprising: reciprocating arm means adapted to advance toward and retract from the die or fixture of a press or the like; motor means for advancing and retracting said arm means; a magnet attached to said arm means; feed means for placing a workpiece of ferrous material within the magnetic field of said magnet when said arm means is retracted, whereby said magnet will grasp the workpiece at one surface thereof; and a projection on said arm means adapted to engage a workpiece held by said magnet at a point between that one surface of the workpiece and an edge of the workpiece spaced therefrom, whereby when said arm means is advanced that spaced edge of the workpiece will engage the die or fixture to pivot the workpiece on said projection away from said magnet to thereby position it on the die or fixture.

3. Apparatus for transporting a workpiece to the die or fixture of a press or the like, comprising: reciprocating arm means adapted to advance to and retract from the die or fixture of a press or the like; motor means for advancing and retracting said arm means; holding means on said arm means for holding a workpiece presented thereto, said holding means being adapted to hold a workpiece by the engagement thereof with a single surface of the latter; a projection on said arm means adapted to engage a workpiece held by said holding means at a point between that single surface of the workpiece and an edge spaced therefrom; feed means for presenting a workpiece to said holding means when said arm means is retracted; and means for tilting said arm means when it is fully advanced and the workpiece held thereby is positioned at the die or fixture, whereby that spaced edge of the workpiece will engage the die or fixture to pivot the workpiece on said projection away from said holding means to thereby position it on the die or fixture.

4. Apparatus for transporting workpieces formed of ferrous material to the die or fixture of a press or the like, comprising: recriprocating arm means adapted to advance toward and retract from the die or fixture of a press or the like; motor means for advancing and retracting said arm means; a magnet attached to said arm means; feed means for placing a workpiece of ferrous material within the magnetic field of said magnet when said arm means is retracted, whereby said magnet will grasp the workpiece adjacent one edge thereof; a projection on said arm means adapted to engage a workpiece held by said magnet at a point between the one edge of the workpiece and an opposite edge thereof; and means for tilting said arm means when it is fully advanced and the workpiece held thereby is positioned at the die or fixture, whereby the opposite edge of the workpiece will engage the die or fixture to pivot the workpiece on said projection away from said magnet to thereby position it on the die or fixture.

5. Apparatus for transporting a workpiece to the die or fixture of a press or the like, comprising: reciprocating arm means adapted to advance to and retract from the die or fixture of a press or the like; motor means for advancing and retracting said arm means; holding means on said arm means for holding a workpiece presented thereto, said holding means being adapted to hold a workpiece by the engagement thereof with a single surface adjacent one edge of the latter; a projection on said arm means adapted to engage a workpiece held by said holding means at a point between the one edge of the workpiece and an opposite edge thereof; feed means for presenting a workpiece to said holding means when said arm means is retracted; connecting means interconnecting said motor means and said arm means, said connecting means being so arranged that when said arm means is advanced by said motor means the latter maintains it in a substantially untilted position and when said motor means starts to retract it allows said arm means to tilt without retracting, whereby the opposite edge of the workpiece will engage the die or fixture to pivot the workpiece on said projection away from said holding means to thereby position it on the die or fixture, said connecting means being also so arranged that further retraction of said motor means will cause the retraction of said arm means; and cam means for urging said arm means from a tilted to an untilted position while the latter is retracting.

6. In an apparatus having a reciprocating arm for transporting workpieces to the die or fixture of a press or the like, an improved workpiece holding means comprising: a magnet mounted upon the reciprocating arm adapted to grasp a workpiece along one surface thereof when the arm is reciprocated away from a die or fixture; and a projection on the arm adapted to engage a workpiece held by said magnet at a point on the workpiece disposed between the surface thereof adjacent said magnet and an edge of the workpiece spaced from that surface, whereby when the arm is reciprocated to the die or fixture this spaced edge of the workpiece will engage the die or fixture to pivot the workpiece on said projection away from said magnet to thereby position it on the die or fixture.

7. In an apparatus having a reciprocating arm for transporting workpieces to the die or fixture of a press or the like, wherein the arm is adapted for reciprocation in a longitudinal direction forwardly to and rearwardly from the die or fixture, an improved workpiece holding means comprising: a magnet mounted upon the reciprocating arm adapted to grasp a workpiece adjacent the rearward edge thereof when the arm is reciprocated away from a die or fixture; and a projection on the arm adapted to engage a workpiece held by said magnet at a point on the workpiece disposed between the rearward edge of the workpiece and a forward edge thereof, whereby when the arm is reciprocated to the die or fixture the forward edge of the workpiece will engage the die or fixture to pivot the workpiece on said projection away from said magnet to thereby position it on the die or fixture.

8. In an apparatus having a reciprocating arm for transporting workpieces to the die or fixture of a press or the like, wherein the arm is adapted for reciprocation in a longitudinal direction forwardly to and rearwardly from the die or fixture, an improved workpiece holding means comprising: a magnet mounted upon the reciprocating arm adapted to grasp a workpiece adjacent the forward edge thereof when the arm is reciprocated away from a die or fixture; and a projection on the arm adapted to engage a workpiece held by said magnet at a point on the workpiece disposed between the forward edge of the workpiece and a rearward edge thereof, whereby when the arm is reciprocated to the die or fixture the rearward edge of the workpiece will engage the die or fixture to pivot the workpiece on said projection away from said magnet to thereby position it on the die or fixture.

9. In an apparatus having a reciprocating arm for transporting workpieces to the die or fixture of a press or the like, wherein the arm is adapted for reciprocation in a longitudinal direction forwardly to and rearwardly from the die or fixture, an improved workpiece holding means comprising: a magnet mounted upon the reciprocating arm adapted to grasp a workpiece adjacent a side edge thereof when the arm is reciprocated away from a die or fixture; and a projection on the arm adapted to engage a workpiece held by said magnet at a point on the workpiece lying in a longitudinal plane intermediate the side edges thereof, whereby when the arm is reciprocated to the die or fixture the opposite side edge of the workpiece will engage the die or fixture to pivot the workpiece on said projection away from said magnet to thereby position it on the die or fixture.

10. Apparatus for transporting a workpiece from a first station to a second station, comprising: arm means adapted to move between said two stations; motor means for moving said arm means; holding means on said arm means for holding a workpiece presented thereto, said holding means being adapted to hold a workpiece by the engagement thereof with a single surface on the latter; feed means for presenting a workpiece to said holding means when said arm is at said first station; pivot means on said arm adapted to abut a workpiece held thereby at a point spaced from the surface thereon engaged by said holding means; and fixed means at said second station adapted to engage a workpiece held by said holding means when said arm means is moving toward said second station to pivot the workpiece about said pivot means and away from said holding means, whereby further movement of said arm means will not move the workpiece from said second station.

11. Apparatus for transporting a workpiece from a first station to a second station, comprising: arm means adapted to move between said two stations; motor means for moving said arm means; holding means on said arm means for holding a workpiece presented thereto, said holding means being adapted to hold a workpiece by the engagement thereof with a single surface on the latter; feed means for presenting a workpiece to said holding means when said arm is at said first station; pivot means on said arm adapted to abut a workpiece held thereby at a point spaced from the surface thereon engaged by said holding means; means for causing said arm means to pivot out of its plane of normal movement toward said second station as it approaches the latter; and fixed means at said second station adapted to engage a workpiece held by said holding means when said arm means is pivoted toward said second station to pivot the workpiece about said pivot means and away from said holding means, whereby further movement of said arm means will not move the workpiece from said second station.

References Cited in the file of this patent
UNITED STATES PATENTS

| | | |
|---|---|---|
| 2,025,935 | Burns | Dec. 31, 1935 |
| 2,763,229 | Sahlin | Sept. 18, 1956 |
| 2,863,550 | Hommel | Dec. 9, 1958 |